United States Patent [19]

Kono et al.

[11] Patent Number: 5,065,849
[45] Date of Patent: Nov. 19, 1991

[54] METHOD FOR CORRECTING DATA USED FOR A CLUTCH CONTROL OPERATION

[75] Inventors: Hiromi Kono; Masuhiro Ohtsuka

[73] Assignee: Diesel Kiki Co., Ltd., Tokyo, Japan

[21] Appl. No.: 503,975

[22] Filed: Apr. 4, 1990

[30] Foreign Application Priority Data

Apr. 12, 1989 [JP] Japan ................................. 1-90772

[51] Int. Cl.⁵ ............................................. B60K 41/28
[52] U.S. Cl. ........................... 192/0.076; 192/0.052; 192/0.092; 364/424.1
[58] Field of Search ............... 192/0.076, 0.052, 0.096, 192/0.092; 364/424.1

[56] References Cited

U.S. PATENT DOCUMENTS

| | | | |
|---|---|---|---|
| 4,518,068 | 5/1985 | Oguma et al. | 192/0.092 X |
| 4,732,246 | 3/1988 | Tateno et al. | 192/0.076 X |
| 4,807,132 | 2/1989 | Arai et al. | 364/424.1 |
| 4,817,776 | 4/1989 | Tateno et al. | 192/0.092 |
| 4,899,858 | 2/1990 | Coté et al. | 192/0.092 X |
| 4,926,994 | 5/1990 | Koshizawa et al. | 192/0.052 X |

FOREIGN PATENT DOCUMENTS 59-6432 10/1984 Japan .
63-71441 1/1989 Japan .

*Primary Examiner*—Allan D. Herrmann
*Assistant Examiner*—Andrea Pitts
*Attorney, Agent, or Firm*—Pollock, Vande Sande & Priddy

[57] ABSTRACT

In a method for correcting clutch data used for controlling the engaging/disengaging operation of a friction type vehicle clutch, the meet position data among the clutch data is updated by a learning operation at each operation of a predetermined operation member of the vehicle, and the updated meet position data is corrected in accordance with the engine speed during the actual operation of the clutch, each time the vehicle is driven off, whereby appropriate correction of the clutch data can be carried out at suitable time intervals.

8 Claims, 3 Drawing Sheets

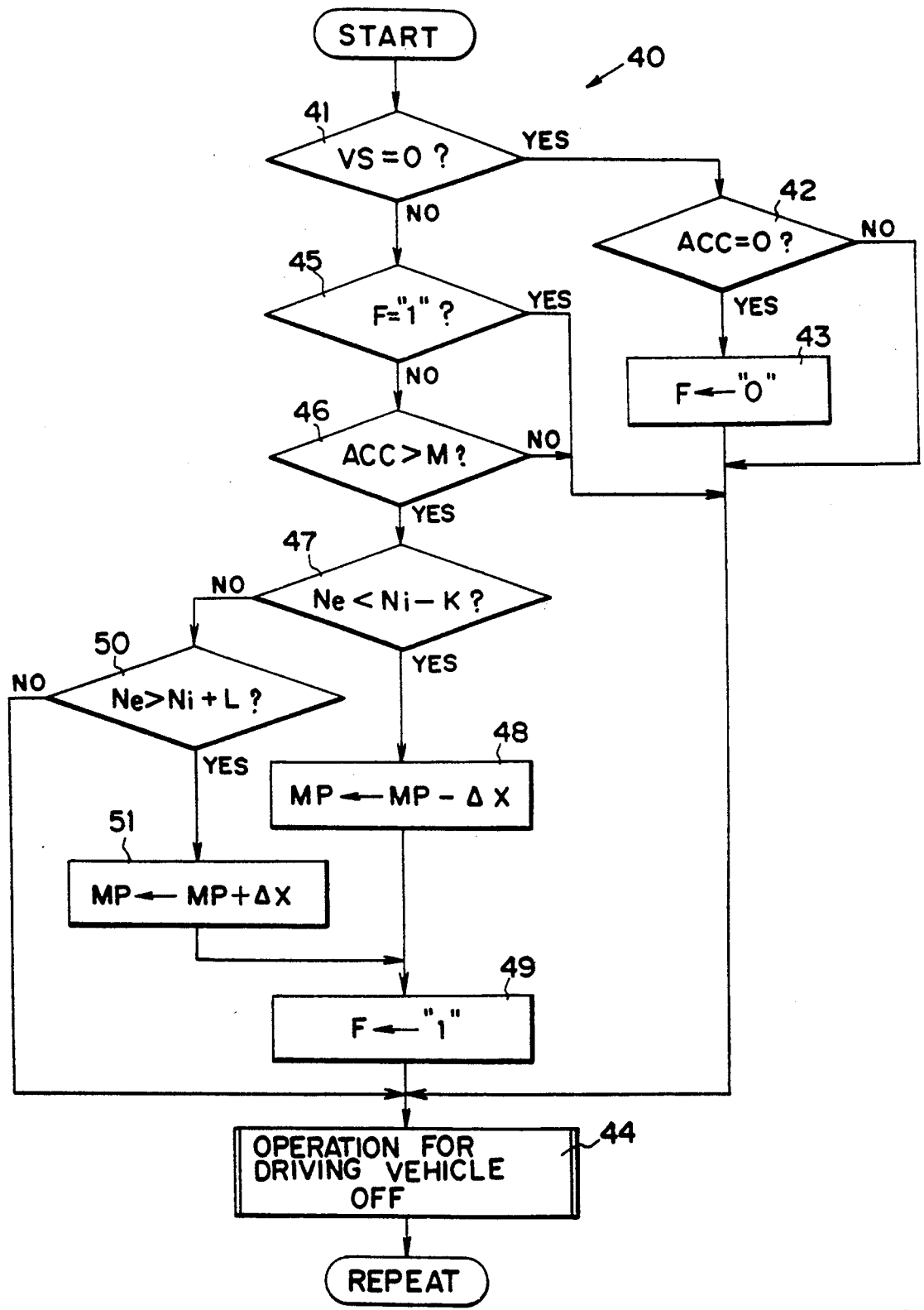

METHOD FOR CORRECTING DATA USED FOR A CLUTCH CONTROL OPERATION

BACKGROUND OF THE INVENTION

1. Field of the Invention

The present invention relates to a method for correcting clutch data used for controlling a clutch, and more particularly to a method for correcting learned data for clutch control operation.

2. Description of the Prior Art

In the prior art there has been widely used a clutch control system for controlling the operation of a friction type clutch in which the clutch is coupled with an actuator and the amount of operation of the clutch is controlled by the actuator in accordance with an electric control signal generated by a control unit. The clutch control system of this type is employed in, for example, a vehicle automatic transmission system. In the case where the operation of the clutch is controlled by the use of the clutch control system of this type, precise clutch data corresponding to the relationship between the position of a member for operating the clutch and the amount of operation of the clutch is required to assure an appropriate clutch control operation. However, variation in this relationship occurs because of impressions in manufacture, and also with the passage of time due to the wear of the clutch disc and the like.

Accordingly, if precise control of the clutch is required, it is necessary to carry out appropriate correction of the clutch data representing the relationship by, for example, a learning operation. In the prior art, for correcting such clutch data, a meet position at which the clutch disc meets the associated clutch pressure plate is determined by a learning operation which is, for example, conducted each time the selector is set to its neutral (N) position, and the clutch data necessary for controlling the clutch is corrected by the use of the resulting learned data to obtain the corrected clutch data.

However, in the case where the learning operation for obtaining the learned data is carried out at the time a prescribed operation condition happens as described above, under certain operation conditions, it will be sometimes happen that the learning operation is not carried out for a long period of time, and this will cause a change in the feel of vehicle when it is driven because the engagement operation of the clutch cannot be smoothly carried out.

SUMMARY OF THE INVENTION

It is an object of the present invention to provide an improved method for correcting data for controlling the operation of a clutch.

It is another object of the present invention to provide a method for correcting data for controlling the operation of a clutch at an appropriate time intervals.

It is still another object of the present invention to provide a method for correcting data used for controlling a clutch by the use of a learned data obtained at an appropriate time.

According to the present invention, in a method for correcting clutch data including meet position data representing a meet position of a friction type clutch connected with an internal combustion engine for powering a vehicle with a transmission system, the meet position data is obtained by a predetermined learning operation each time a member for selecting the operation mode of the transmission system is set to a prescribed selected state. The operation condition of the internal combustion engine is detected on the basis of the rotational speed of the engine during the operation of the clutch each time the engaging operation of the clutch for driving the vehicle off is carried out, and the clutch data is corrected in accordance with the detected operation condition of the internal combustion engine. The engine speed will be maintained at a proper speed during the operation of the clutch engagement in the case where the actual meet position is substantially equal to that shown by the clutch data. In contrast, the engine speed will become lower or higher than the appropriate engine speed when the actual meet position of the clutch is different from the position indicated by the clutch data, and the clutch data is corrected in accordance with the detected condition of the engine speed in such a way that an adequate engine speed is obtained during the engaging operation of the clutch.

BRIEF EXPLANATION OF THE DRAWINGS

FIG. 4 is a flowchart of the second program of the control program for controlling the clutch.

DESCRIPTION OF THE PREFERRED EMBODIMENT

Figure 1:
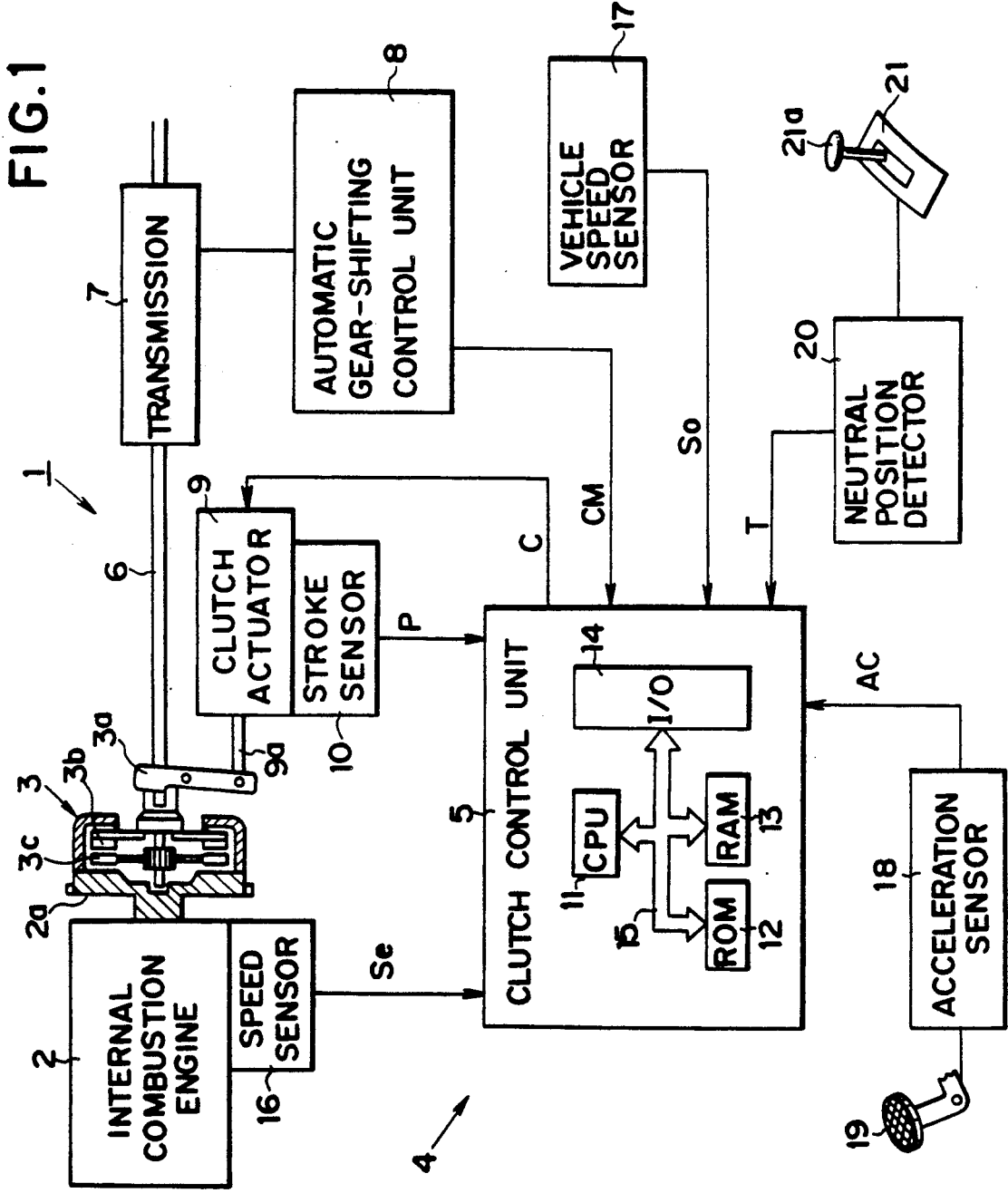
FIG. 1 is a schematical view illustrating an embodiment of a vehicle control system including a clutch control system in which clutch data concerning a friction type clutch is corrected in accordance with the present invention.

FIG. 1 schematically shows an embodiment of a vehicle control system including a clutch control system in which clutch data concerning a friction type clutch is corrected according to the method of the present invention. Reference numeral 1 generally designates a vehicle control system for a vehicle (not shown) powered by an internal combustion engine 2, and a friction clutch 3 is mounted on an engine flywheel 2a. The friction clutch 3 is a well-known dry-type single-disc clutch having a clutch release lever 3a, a pressure plate 3b and a clutch disc 3c, and the friction clutch 3 is controlled by a clutch control system 4 including a clutch control unit 5. The clutch 3 is connected by a connecting rod 6 with a gear transmission 7, which is associated with an automatic gear-shifting control unit 8 to form a conventional automatic gear-shifting control system.

In order to control the engaging/disengaging (ON/OFF) operation of the clutch 3 in response to an electric signal, the clutch control system 4 has a clutch actuator 9 having a piston rod 9a connected with the clutch release lever 3a, and the clutch actuator 9 is responsive to a control signal C generated by the clutch control unit 5 to control the position of the pressure plate 3b, whereby the amount of operation of the clutch 3 can be controlled.

For detecting how the clutch 3 is being operated at each moment, in other words, for detecting the operation condition of the clutch 3, a stroke sensor 10 is coupled with the clutch actuator 9 to detect the operation position of the release lever 3a of the clutch 3 and a position signal P indicating the operation position of the release lever 3a is produced by the stroke sensor 10. Since the position of the pressure plate 3b, on which the operation condition of the clutch 3 depends, has a predetermined relation with the operation position of the release lever 3a, it follows that the position signal P from the stroke sensor 10 indicates the position of the pressure plate 3b.

The position signal P is supplied to the clutch control unit 5 which includes a central processing unit (CPU) 11, read-only memory (ROM) 12, random access memory (RAM) 13 and I/0 interface 14, which are interconnected by a bus 15 to form a conventional microcomputer system.

Associated with the internal combustion engine 2 is a speed sensor 16 which is a sensor of well-known design for detecting the input rotational speed of the clutch 3 and producing a first speed signal Se indicating this speed. A vehicle speed sensor 17, which is a conventional sensor for detecting the running speed of the vehicle, produces a second speed signal So showing the vehicle running speed. The first and second speed signals Se and So are supplied to the clutch control unit 5 to which an acceleration signal AC indicating the amount of operation of an accelerator pedal 19 is further applied from an acceleration sensor 18, for detecting the amount of operation of the accelerator pedal 19.

Data corresponding to the designed-in relationship between the position of the pressure plate 3b indicated by the position signal P and the operation condition of the clutch 3 is stored in the ROM 12 as initial clutch data. The initial clutch data includes first data showing an OFF position $P_1$ of the clutch 3 at which the pressure plate 3b is maximally apart from the clutch disc 3c and the clutch 3 is in its fully disengaged state, second data showing a meet position $P_2 (>P_1)$ of the clutch 3 which is a boundary position between the disengaged state and the semi-engaged state of the clutch 3, third date showing a finish position $P_3 (>P_2)$ of the clutch 3 which is a boundary position between the semi-engaged state and the engaged state of the clutch 3, and fourth data showing an ON position $P_4 (>P_3)$ at which the pressure plate 3b maximally pushes the clutch disc 3c to obtain the fully engaged state of the clutch 3.

Figure 2:
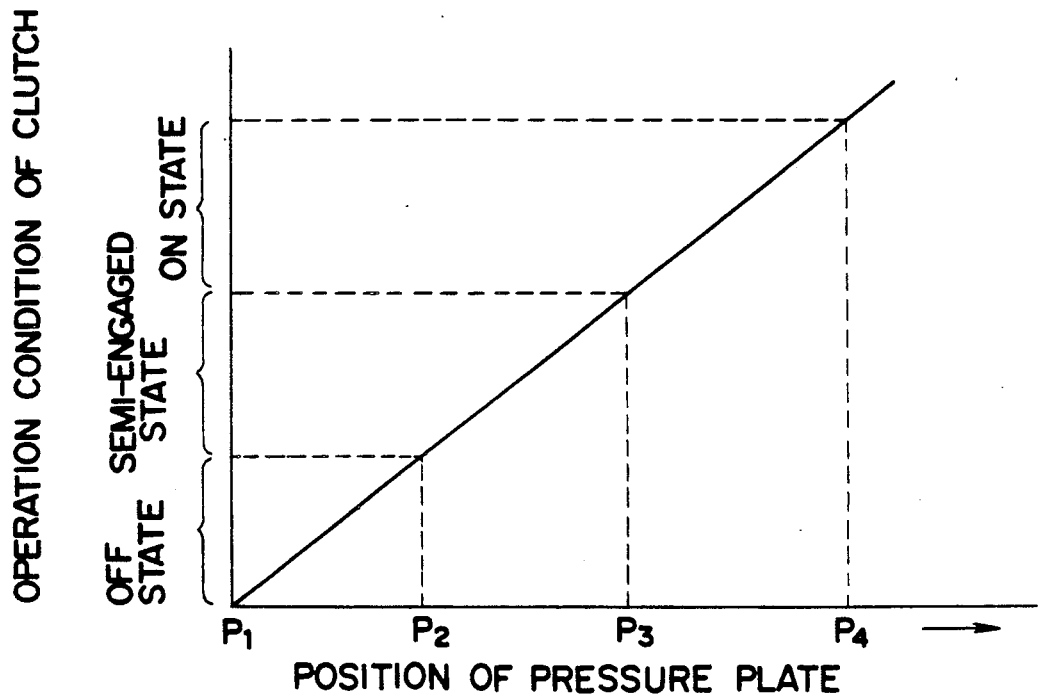
FIG. 2 is a graph showing the relationship between the position of the pressure plate of the clutch shown in FIG. 1 and the operation condition of the clutch on the basis of the initial data.

In FIG. 2, the relationship based on the initial clutch data between the position of the pressure plate 3b of the clutch 3 and the operation condition thereof is illustrated.

The initial clutch data stored in the ROM 12 is transferred to the RAM 13 in response to the supply of power to the clutch control unit 5, and the initial clutch data is stored in the RAM 13 as clutch data used for controlling the clutch 3. The clutch control unit 5 is responsive to a command signal CM produced from the automatic gear-shifting control unit 8, and produces the control signal C for controlling the clutch 3 with reference to the clutch data stored in the RAM 13 and the position signal P so as to obtain the desired operation condition of the clutch 3 in accordance with the command signal CM. In this embodiment, the command signal CM is for commanding the start time of the operation for engaging/disengaging the clutch 3 in order to carry out the automatic gear-shifting operation of the transmission 7.

Since the relationship between the position of the pressure plate 3a position indicated by the position signal P and the operation condition of the clutch 3 varies due to the wear of the various portions of the clutch 3 with the passage of time, for assuring precise control of the clutch 3, it is necessary to correct the clutch data at appropriate time intervals. For this purpose, the clutch control system 4 shown in FIG. 1 has a neutral position detector 20 coupled with a gear selector 21 having a selecting lever 21a, and a learning timing signal T is generated from the neutral position detector 20 each time the selecting lever 21a is positioned at its neutral (N) position. The learning timing signal T is applied to the clutch control unit 5 and a predetermined learning operation for detecting the actual meet position is carried out by the clutch control unit 5 to produce learned data showing the resulting learned meet position. The clutch data stored in the RAM 13 is corrected by the use of the learned data in a way similar to the conventional manner.

In order to correct the clutch data more frequently in addition to the correction based on the learned data obtained as described above, in the vehicle control system 1 shown in FIG. 1 the second data showing the meet position of the clutch 3 is corrected on the basis of the actual operation condition of the clutch 3 each time the clutch 3 is engaged to drive the vehicle off, and the clutch data stored in the RAM 13 is corrected based on the up-dated second data.

The leaning and correcting operations described above are carried out by the clutch control unit 5 in accordance with a control program stored in the ROM 12 in advance, which is executed in the microcomputer system of the clutch control unit 5. This control program is composed of first and second programs, and the operation of the clutch control unit 5 will be now described with reference to the flowcharts shown in FIGS. 3 and 4.

Figure 3:
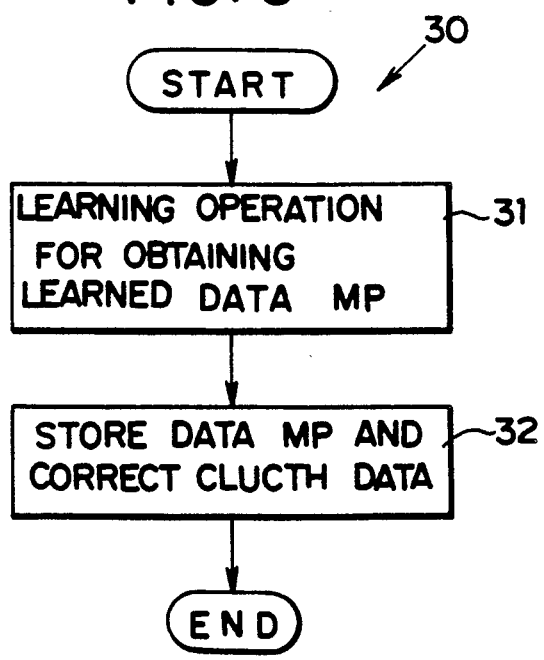
FIG. 3 is a flowchart of the first program of the control program for controlling the clutch.

The first program 30 shown in FIG. 3 is adapted to be executed each time the learning timing signal T is applied to the clutch control unit 5. After the start of the execution of the program 30, the operation moves to step 31 in which the control signal C is produced for operating the clutch 3 so as to detect the actual meet position of the clutch 3 at that time, and the actual meet position of the clutch 3 is determined on the basis of the first speed signal Se and the position signal P supplied to the clutch control unit 5 at that time, whereby learned data MP showing the current meet position of the clutch 3 is obtained. Then, the operation moves to step 32 in which the learned data MP is stored in the RAM 13 as the up-dated second data MP, and the clutch data stored in the RAM 13 is corrected on the basis of the up-dated second data MP. Thus, the clutch 3 is controlled in accordance with another program with reference to the updated clutch data.

FIG. 4 is a flowchart of the second program 40 for controlling vehicle drive-off and for correcting the up-dated second data, which is obtained by the first program 30, in accordance with the present invention, and the second program 40 is repeatedly executed at relatively short time intervals.

When the execution of the second program 40 is started, the operation moves to step 41 wherein discrimination is made as to whether or not the vehicle speed VS is zero on the basis of the second speed signal So. The determination in step 41 is YES when the vehicle speed VS is zero, so that the operation moves to step 42 wherein discrimination is made as to whether or not the amount ACC of operation of the accelerator pedal 19 is zero on the basis of the acceleration signal AC. The determination in step 42 is YES when ACC=0, so that the operation moves to step 43 wherein a flag F is cleared, and the operation moves to step 44. The flag F is for indicating whether or not the correcting operation of the up-dated second data has been already carried out at the time the clutch 3 is engaged for driving the vehicle off, and the flag F is cleared in the initialization operation of the second program 40. The determination in step 42 is NO if the amount ACC of operation of the accelerator pedal 19 is not zero, and the operation moves to step 44 without execution of step 43.

In step 44, discrimination is made on the basis of the signals input to the clutch control unit 5 as to whether or not the operation conditions of the vehicle match the conditions required for permitting the vehicle to drive off, and the clutch control operation necessary for driving the vehicle off is carried out on the basis of the clutch data in a way similar to the conventional manner for engaging the clutch to drive the vehicle off if the conditions necessary for vehicle drive-off are all met. In contrast, if the conditions necessary for the vehicle drive-off are not all met, it follows that no operation of the clutch 3 is carried out in step 44.

If the vehicle speed VS is not zero, the determination in step 41 is NO and the operation moves to step 45, wherein discrimination is made as to whether or not the flag F is set. The determination in step 45 becomes NO if the flag F is not set, and the operation for correcting the updated second data obtained by the learning operation is carried out as described below. In contrast, the operation moves to step 44 when the determination in step 45 is YES because of the set condition of the flag F.

In step 46 discrimination is made as to whether or not the amount ACC of operation of the accelerator pedal 19 is greater than a prescribed level M, and the operation moves to step 47 when ACC is greater than M. Discrimination is made in step 47 as to whether or not Ne is less than Ni-K, where Ne is an engine speed indicated by the first speed Se and Ni is a set engine speed of the internal combustion engine 2, which is set at its idling speed in this embodiment, but is not limited to the idling speed. K is a constant. Namely, the discrimination is made in step 47 as to whether or not the power output of the engine is insufficient for the load condition of the engine during the operation of the clutch engagement, i.e., whether the engine 2 is in a prescribed power insufficiency state.

The determination in step 47 is YES when the power insufficiency of the engine 2 is worse than a prescribed power insufficiency state, and the operation moves to step 48 wherein the second data MP is decreased by a fixed value $\Delta X$. Since the magnitude of the second data MP becomes greater as the meet position moves toward the direction of engagement of the clutch 3, it follows that the meet position indicated by the second data MP is shifted by the value $\Delta X$ in the opposite direction to the clutch disc 3c in accordance with the correction in step 48. After the execution of step 48 the operation next moves to step 49 wherein the flag F is set, and the operation moves to step 44.

When the determination in step 47 is NO, the operation moves to step 50 wherein discrimination is made as to whether or not Ne is greater than Ni+L, where L is a constant, which may be equal to K. However, L can of course be set so as to be different from K. That is, the discrimination is made in step 50 as to whether or not the engine speed exceeds a predetermined appropriate engine speed, namely, Ni+L. When the determination in step 50 is YES, the operation moves to step 51 wherein the second data MP is increased by the fixed value $\Delta X$. In other words, the meet position indicated by the second data MP at that time is corrected so as to be shifted forward by the value $\Delta X$, and data indicating the corrected meet point is stored as the second data MP. The flag F is set in step 49 after the execution of step 51. In contrast, when the determination in step 50 is NO, the operation moves to step 44 without the correction of the second data MP to carry out the control operation for driving the vehicle off, if necessary.

In this embodiment the magnitude of the steps for correcting the second data MP is $\Delta X$ in both steps 48 and 51. However, the step amounts used in steps 48 and 51 can be set to be different values.

With this constitution, if the accelerator pedal 19 is depressed just after the vehicle is driven off in the case where the second program 40 is repeatedly executed at the predetermined time intervals, the discrimination is made as to whether or not the second data should be corrected only when ACC is greater than M. This discrimination is made on the basis of the engine speed. When Ne is smaller than Ni−K, to avoid the occurrence of power insufficiency, the second data MP is reduced by $\Delta X$ to shift the meet position indicated by the second data MP by an amount corresponding to $\Delta X$ toward the direction of disengagement of the clutch 3. In contrast, when Ne is equal to or greater than Ni−K, the operation moves to step 50 wherein discrimination is made as to whether or not Ne is greater than Ni+L. In the case where Ne is greater than Ni+L, to avoid the excess of the engine speed, the second data MP is increased by $\Delta X$ to shift the meet position indicated by the second data MP by an amount corresponding to $\Delta X$ toward the direction of engagement of the clutch 3.

The second data MP corrected in step 48 or 51 is used for correcting the clutch data in step 44, and the operation of the clutch 3 is controlled on the basis of the corrected clutch data. This correction is made by, for example, correcting the third and fourth data by $\Delta X$ so as to shift the positions $P_3$ and $P_4$ by an amount corresponding to $\Delta X$ toward the direction of engagement or disengagement of the clutch 3.

In the case where Ne is not smaller than Ni−K and is not greater than Ni+L, the correcting operation for the second data MP is not effected because the clutch data, especially the second data is considered to be appropriate. Since the flag F is not set in this case, the determination in step 45 remains NO during the operation for driving the vehicle off. In contrast, since the flag F is set in step 49 when the second data MP is once corrected, after this, the determination in step 45 is always YES until operation of the vehicle is discontinued.

As described above, the learning operation is carried out to obtain the second data MP each time the neutral (N) position of the gear selector 21 is established by the selecting lever 21a, and the resulting second data is further corrected on the basis of the actual operation condition of the clutch 3 each time the vehicle is driven off. Consequently, the second data obtained by the learning operation can be corrected at an appropriate frequency even if the gear selector 21 is seldom set in the neutral position. Furthermore, the correction of the second data is carried out on the basis of the actual operation condition of the clutch 3, so that excellent data correction can be attained, whereby change in the feel of the vehicle when it is driven can be effectively eliminated.

We claim:

1. A method for correcting clutch data relating to a friction type clutch connected with an internal combustion engine for carrying out an engaging operation for driving off a vehicle with a transmission system, the clutch data including meet position data representing a meet position of the clutch, said method comprising the steps of:
updating the meet position data by a predetermined learning operation each time a member for selecting an operation mode of the transmission system is set to a prescribed selected state;
detecting an operation condition of the internal combustion engine on the basis of a rotational speed of the engine during the engaging operation of the clutch each time the engaging operation of the clutch for driving the vehicle off is carried out; and
correcting the meet position data obtained in said updating step in accordance with the detected operation condition obtained in said detecting step.

2. A method as claimed in claim 1, wherein the detected operation condition is whether or not the rotational speed of the engine during the engaging operation of the clutch is in a predetermined speed range, and the meet position data obtained in said updating step is corrected in accordance with said detected operation condition of the engine speed.

3. A method as claimed in claim 2, wherein an upper limit of the predetermined speed range is set at a higher speed than an idling speed of the engine by a prescribed level, and a lower limit of the predetermined speed range is set at a lower speed than the idling speed of the engine by another prescribed level.

4. A method as claimed in claim 3, wherein the meet position data is corrected so as to reduce the engine speed when it is detected that the engine speed exceeds the upper limit during the engaging operation of the clutch.

5. A method as claimed in claim 3, wherein the meet position data is corrected so as to increase the engine speed when it is detected that the engine speed falls below the lower limit during the engaging operation of the clutch.

6. A method as claimed in claim 4, wherein the meet position data is corrected by a predetermined magnitude each time it is detected that the engine speed exceeds the upper limit during the engaging operation of the clutch.

7. A method as claimed in claim 5, wherein the meet position data is corrected by a predetermined magnitude each time it is detected that the engine speed falls below the lower limit during the engaging operation of the clutch.

8. A method for correcting clutch data used for controlling a friction type clutch connected with an internal combustion engine for carrying out an engaging operation for driving off a vehicle with a transmission system, the clutch data including meet position data representing a meet position of the clutch, said method comprising the steps of:
updating the meet position data by a predetermined learning operation each time a member for selecting an operation mode of the transmission system is set to a neutral position;
obtaining information concerning change in the clutch data on the basis of a rotational speed of the engine during the engaging operation of the clutch each time the engaging operation of the clutch for driving the vehicle off is carried out; and
correcting the clutch data in accordance with the meet position data obtained in said updating step and the information obtained in said information obtaining step.

* * * * *

UNITED STATES PATENT AND TRADEMARK OFFICE
CERTIFICATE OF CORRECTION

PATENT NO. : 5,065,849
DATED : November 19, 1991
INVENTOR(S) : Hiromi Kono and Masuhiro Ohtsuka and Yuji Satoh It is certified that error appears in the above-indentified patent and that said Letters Patent is hereby corrected as shown below:

On the cover page, Item [75] after "Maushiro Ohtsuka" insert --Yuji Satoh, Higashimatsuyama, Japan --.

Signed and Sealed this

Eighth Day of February, 1994

Attest:

BRUCE LEHMAN

Attesting Officer   Commissioner of Patents and Trademarks